A. G. BROWN.
PROCESS OF PREPARING AND EXTRACTING VEGETABLE FIBER FROM YUCCA AND THE LIKE.
APPLICATION FILED DEC. 24, 1917.
1,277,185.   Patented Aug. 27, 1918.
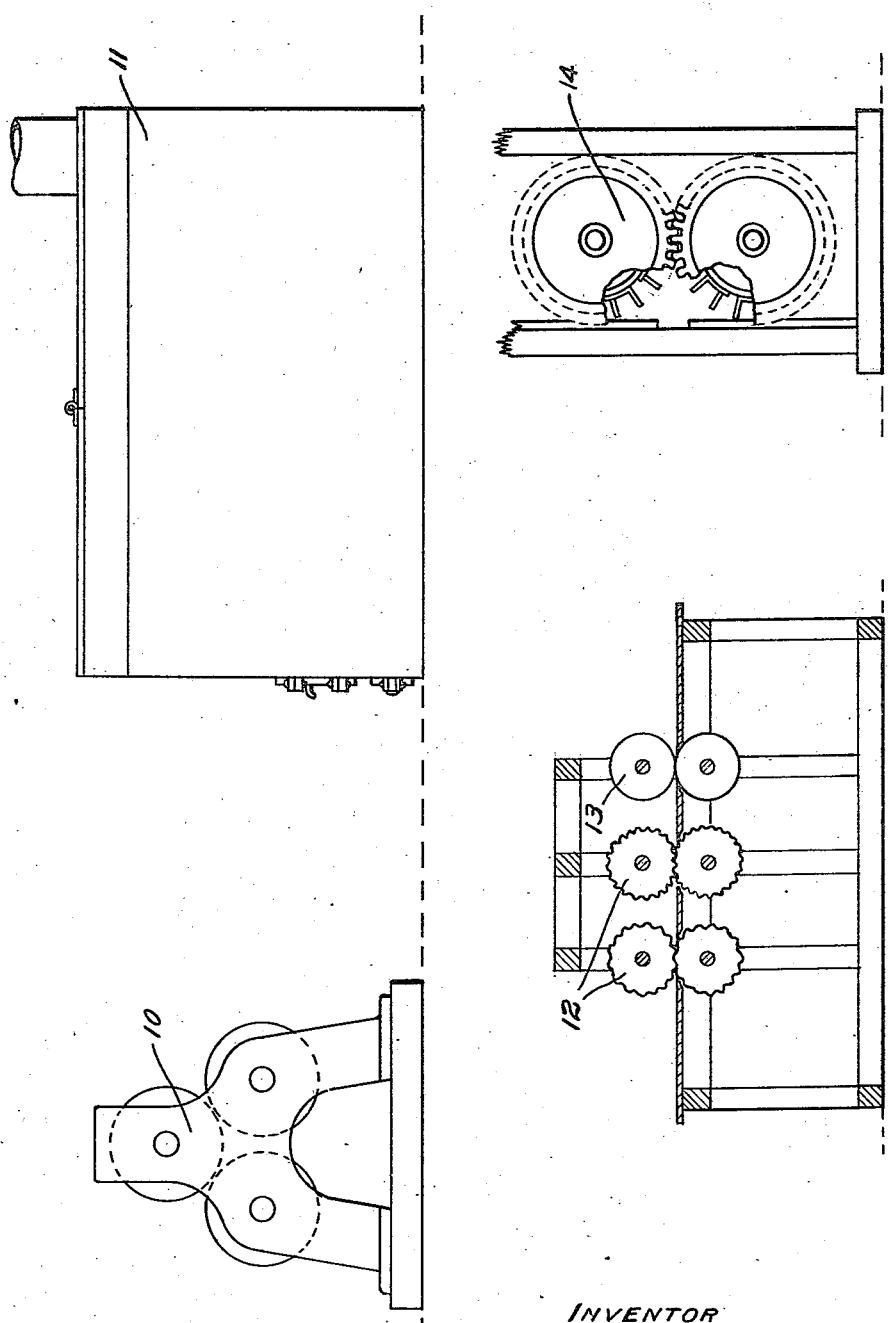
INVENTOR
ALFRED G. BROWN
BY Hazard & Miller
ATT'YS.

UNITED STATES PATENT OFFICE.

ALFRED G. BROWN, OF LOS ANGELES, CALIFORNIA, ASSIGNOR TO YUSI FIBRE COMPANY, OF LOS ANGELES, CALIFORNIA, A CORPORATION OF CALIFORNIA.

PROCESS OF PREPARING AND EXTRACTING VEGETABLE FIBER FROM YUCCA AND THE LIKE.

1,277,185.            Specification of Letters Patent.     Patented Aug. 27, 1918.

Application filed December 24, 1917. Serial No. 208,691.

*To all whom it may concern:*

Be it known that I, ALFRED G. BROWN, a citizen of the United States, residing at Los Angeles, in the county of Los Angeles and State of California, have invented new and useful Improvements in Processes of Preparing and Extracting Vegetable Fiber from Yucca and the like, of which the following is a specification.

My process relates to a process of preparing and extracting vegetable fiber from yucca plants and the like.

The great demand for vegetable fiber, such as manila, sisal, and the like, and the constantly increasing cost of production have stimulated inventors to look for other sources of supply.

It has been found that the yucca plant and similar plants contain a vegetable fiber of excellent quality suitable for use as manila and sisal, but the process of separating the cellular tissue from the bast fiber has been laborious and expensive.

It is an object of this invention to provide a process of quickly and economically extracting vegetable fiber from yucca plants and the like.

My invention consists in the steps of the process hereinafter described and claimed.

In the accompanying drawings, I have illustrated diagrammatically the apparatus used in carrying out my process.

The green leaves of the yucca plant are fed through the crusher 10, which may be of any suitable construction, but I preferably use a crusher similiar to the sugar cane crusher.

The object of the crusher is to break the leaves so as to prepare the same for the next step in the operation, which is the boiling process. The crushed leaves are next introduced into the boiler 11, of any suitable construction, and boiled therein from twenty minutes to three or four hours, depending upon the condition of the leaves, in order to facilitate the softening of the cellular tissue, or I may introduce a caustic solution, such as sodium hydroxid or a soap powder.

The leaves, after being boiled, pass through one or more sets of corrugated rollers 12, which serve to loosen and partially separate the cellular tissue from the fiber. I also may use one or more sets of rubber rolls 13 in connection with the corrugated rolls. The rubber rolls 13 may be so constructed that the surface speed of one of the rolls is greater than that of the other, thereby effecting, besides the pressing action, a pulling action on the leaves, which assists in loosening the cellular tissue from the fiber. I may find it advisable to treat the leaves as they are passed through the corrugated rollers 12 with jets of water in order to wash out a portion of the cellular tissue which adheres loosely to the fibers.

The last operation is the treating of the leaves thus prepared with the scutching machine 14. I have shown an ordinary type of scutching machine, although I prefer to use the machine shown in my co-pending application for a vegetable fiber scutching and cleaning machine, Serial No. 176,121, filed June 21, 1917.

The scutching machine separates the remaining portion of the cellular tissue from the vegetable fiber, which is then dried by any suitable apparatus.

By subjecting the leaves to the step of boiling, as described, I greatly facilitate the thorough and quick removal of the cellular tissue from the fiber.

The leading step in my process of extracting fiber from yucca consists in passing the cooked leaves through corrugated rollers and then between differentially driven pulling rollers so as to pull the fiber from the pulp. By differentially pulling rollers I mean a set of rollers where the periphery of one roller runs faster than the periphery of the other roller so as to make a rubbing and pulling action upon the soft cooked material, thereby loosening the pulp from the fiber.

While I have shown the preferred construction of my process of preparing and extracting vegetable fiber from yucca plants and the like, as now known to me, it will be understood by those skilled in the art that various changes in the combination, construction and arrangement of parts may be made without departing from the spirit of my invention as claimed.

I claim:

1. The art of separating fiber from yucca leaves which consists in passing the green leaves between crushing rollers, cooking the crushed green leaves, passing the cooked material between corrugated rollers and then between differential smooth rollers, and then passing the soft wet material through a scutching machine.

2. The art of separating fiber from yucca leaves which consists in cooking the leaves and then passing the soft wet leaves through a scutching machine.

In testimony whereof I have signed my name to this specification.

ALFRED G. BROWN.